(12) United States Patent
Chi et al.

(10) Patent No.: US 7,496,592 B2
(45) Date of Patent: Feb. 24, 2009

(54) SYSTEMS AND METHODS FOR MAINTAINING CLOSED FREQUENT ITEMSETS OVER A DATA STREAM SLIDING WINDOW

(75) Inventors: Yun Chi, Los Angeles, CA (US); Haixun Wang, Irvington, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 11/046,926

(22) Filed: Jan. 31, 2005

(65) Prior Publication Data

US 2006/0174024 A1 Aug. 3, 2006

(51) Int. Cl.
G06F 17/00 (2006.01)
(52) U.S. Cl. ....................... 707/102; 345/660
(58) Field of Classification Search ............... None
See application file for complete search history.

(56) References Cited

U.S. PATENT DOCUMENTS

| | | | |
|---|---|---|---|
| 6,826,569 B2 * | 11/2004 | Robertson ...................... | 707/6 |
| 2005/0240582 A1 * | 10/2005 | Hatonen et al. ................. | 707/6 |
| 2006/0047497 A1 * | 3/2006 | Chen et al. ..................... | 704/1 |

OTHER PUBLICATIONS

Mohammed J. Zaki. et al, "Charm: An Efficient Algorithm for Closed Itemset Mining", Computer Science Department, Ressselaer Polytechnic Institute, Troy NY, 2002, 17 pages.*
Joong Hyuk Chang, et al, "Finding Recent Frequent Itemsets Adaptively over Online Data Streams", Department of Computer Science, Yonsei University, ACM, 2003, pp. 487-492.*

(Continued)

Primary Examiner—Apu M Mofiz
Assistant Examiner—Hung D Le
(74) Attorney, Agent, or Firm—Ference & Associates LLC

(57) ABSTRACT

Towards mining closed frequent itemsets over a sliding window using limited memory space, a synopsis data structure to monitor transactions in the sliding window so that one can output the current closed frequent itemsets at any time. Due to time and memory constraints, the synopsis data structure cannot monitor all possible itemsets, but monitoring only frequent itemsets makes it difficult to detect new itemsets when they become frequent. Herein, there is introduced a compact data structure, the closed enumeration tree (CET), to maintain a dynamically selected set of itemsets over a sliding-window. The selected itemsets include a boundary between closed frequent itemsets and the rest of the itemsets Because the boundary is relatively stable, the cost of mining closed frequent itemsets over a sliding window is dramatically reduced to that of mining transactions that can possibly cause boundary movements in the CET.

12 Claims, 8 Drawing Sheets

OTHER PUBLICATIONS

Wei-Guang Teng, et al, "A Regression-Based Temporal Pattern Mining Scheme for Data Streams", Proceedings of the 29th VLDB Conference, Berlin, Germany, 2003, 12 pages.*

Chang-Hung Lee, et al, "Sliding-Window Fitering: An Efficient Algorithm for Incremental Mining", Department of Electrical Engineering, National Taiwan University, ACM, 2001, pp. 263-270.*

Bayardo, Roberto J., Jr., Efficiently Mining Long Patterns from Databases, appears in Proceedings of the 1998 ACM-SIGMOD International Conference on Management of Data, 85-93.

Gouda, Karam, and Zaki, Mohammed J., Efficiently Mining Maximal Frequent Itemsets, in the Proceedings of the 2001 IEEE International Conference on Data Mining, 2001.

Wang, J., Han, J., and Pie, J., Closet+ searching for the best strategies for mining frequent closed itemsets, in proceedings of the 2003 International Conference Knowledge Discovery and Data Mining (SIGKDD'03), 2003.

Zaki, M. J., Fast Vertical Mining Using Diffsets, in proceedings of the 2003 International Conference Knowledge Discovery and Data Mining (SIGKDD'03), 2003.

* cited by examiner

| tid | items |
|---|---|
| 1 | C,D |
| 2 | A,B |
| 3 | A,B,C |
| 4 | A,B,C |
| 5 | A,C,D |
| 6 | B,C | time line ↓ window #1: tid 2–4
window #2: tid 3–5
window #3: tid 4–6

Fig. 1

Explore ($n_I$, $\mathcal{D}$, $minsup$)

1:   if $support(n_I) < minsup \; |\mathcal{D}|$ then

2:      mark $n_I$ an infrequent gateway node;

3:   else if $leftcheck(n_I) = true$ then

4:      mark $n_I$ an unpromising gateway node;

5:   else

6:      foreach frequent right sibling $n_K$ of $n_I$ do

7:          create a new child $n_{I \cup K}$ for $n_I$;

8:          compute $support$ and $tid\_sum$ for $n_{I \cup K}$;

9:      foreach child $n_{I'}$ of $n_I$ do

10:          Explore($n_{I'}$, $\mathcal{D}$, $minsup$);

11:      if $\exists$ a child $n_{I'}$ of $n_I$ such that $support(n_{I'}) = support(n_I)$ then 12:          mark $n_I$ an intermediate node;

13:      else

14:          mark $n_I$ a closed node;

15:          insert $n_I$ into the hash table;

Fig. 3

| | Addition ($n_I$, $I_{new}$, $\mathcal{D}$, minsup) |
|---|---|
| 1: | if $n_I$ is not relevant to the addition then return; |
| 2: | foreach child node $n_{I'}$ of $n_I$ do |
| 3: | update *support* and *tid_sum* of $n_{I'}$; |
| 4: | $\mathcal{F} \leftarrow \{n_{I'} | n_{I'}$ is newly frequent$\}$; |
| 5: | foreach child node $n_{I'}$ of $n_I$ do |
| 6: | if $n_{I'}$ is infrequent then |
| 7: | (re)mark $n_{I'}$ an infrequent gateway node; |
| 8: | else if $leftcheck(n_{I'}) = true$ then |
| 9: | (re)mark $n_{I'}$ an unpromising gateway node; |
| 10: | else if $n_{I'}$ is a newly frequent node or $n_{I'}$ is a newly promising node then |
| 11: | Explore($n_{I'}$, $\mathcal{D}$, minsup); |
| 12: | else |
| 13: | foreach $n_K \in \mathcal{F}$ s.t. $I' \prec K$ do |
| 14: | add $n_{I' \cup K}$ as a new child of $n_{I'}$; |
| 15: | Addition($n_{I'}$, $I_{new}$, $\mathcal{D}$, minsup); |
| 16: | if $n_{I'}$ was a closed node then |
| 17: | update $n_{I'}$'s entry in the hash table; |
| 18: | else if $\not\exists$ a child node $n_{I''}$ of $n_{I'}$ s.t. $support(n_{I''}) = support(n_{I'})$ then |
| 19: | mark $n_{I'}$ a closed node; |
| 20: | insert $n_{I'}$ into the hash table; |
| 21: | return; |

Fig. 5

Deletion ($n_I$, $I_{old}$, $minsup$)

1: if $n_I$ is not relevant to the deletion then return;
2: foreach child node $n_{I'}$ of $n_I$ do
3:     update *support* and *tid_sum* of $n_{I'}$;
4: $\mathcal{F} \leftarrow \{n_{I'} | n_{I'}$ is newly infrequent$\}$;
5: foreach child node $n_{I'}$ of $n_I$ do
6:     if $n_{I'}$ was infrequent or unpromising then
7:         continue;
8:     else if $n_{I'}$ is newly infrequent then
9:         prune $n_{I'}$'s descendants from CET,
10:         mark $n_{I'}$ an infrequent gateway node;
11:     else if $leftcheck(n_{I'}) = true$ then
12:         prune $n_{I'}$'s descendants from CET;
13:         mark $n_{I'}$ an unpromising gateway node;
14:     else
15:         foreach $n_K \in \mathcal{F}$ s.t. $I' \prec K$ do
16:             prune $n_{I' \cup K}$ from the children of $n_{I'}$;
17:         Deletion($n_{I'}$, $I_{old}$, $minsup$);
18:         if $n_{I'}$ was closed and $\exists$ a child $n_{I''}$ of $n_{I'}$
            s.t. $support(n_{I''}) = support(n_{I'})$ then
19:             mark $n_{I'}$ an intermediate node;
20:             remove $n_{I'}$ from the hash table;
21:         else if $n_{I'}$ was a closed node then
22:             update $n_{I'}$'s entry in the hash table;
23: return;

Fig. 8

SYSTEMS AND METHODS FOR MAINTAINING CLOSED FREQUENT ITEMSETS OVER A DATA STREAM SLIDING WINDOW

FIELD OF THE INVENTION

The present invention relates generally to the problem of mining closed frequent itemsets over a sliding window using limited memory space.

BACKGROUND OF THE INVENTION

Numerals appearing in square brackets herebelow—[ ]—are keyed to the list of references found at the end of the disclosure.

Data streams arise with the introduction of new application areas, including ubiquitous computing and electronic commerce. Mining data streams for knowledge discovery is important to many applications, such as fraud detection, intrusion detection, trend learning, etc. One problem that has long been considered is that of mining closed frequent itemsets on data streams.

Mining frequent itemsets on static datasets has been studied extensively. However, data streams have posed new challenges. First, data streams tend to be continuous, high-speed, and unbounded. Archiving everything from streams is virtually impossible, not to mention mining association rules from them using algorithms that require multiple scans. Second, the data is not stationary, that is, the data distribution in streams are usually changing with time, and very often people are interested in the most recent patterns.

It is thus of great interest to mine itemsets that are currently frequent. One approach is to always focus on frequent itemsets in the most recent window. A similar effect can be achieved by exponentially discounting old itemsets. For the window-based approach, one can immediately come up with two "naïve" methods:

1. Regenerate frequent itemsets from the entire window whenever a new transaction comes into or an old transaction leaves the window.
2. Store every itemset, frequent or not, in a traditional data structure such as the prefix tree, and update its support whenever a new transaction comes into or an old transaction leaves the window.

Clearly, method 1 above is not efficient. In fact, as long as the window size is reasonable, and the conceptual drifts in the stream is not too dramatic, most itemsets do not change their status (from frequent to non-frequent or from non-frequent to frequent) often. Thus, instead of regenerating all frequent itemsets every time from the entire window, it may well be reasonable to adopt an incremental approach.

Method 2, as such, is incremental. However, its space requirement makes it infeasible in practice. The prefix tree is often used for mining association rules on static data sets. In a prefix tree, each node $n_I$ represents an itemset I and each child node of $n_J$ represents an itemset obtained by adding a new item to I. The total number of possible nodes is exponential. Due to memory constraints, it is difficult to keep a prefix tree in memory, and disk-based structures will make real time update costly.

In view of these challenges, one may wish to focus on a dynamically selected set of itemsets that are i) informative enough to answer at any time queries such as "what are the (closed) frequent itemsets in the current window", and at the same time, ii) small enough so that they can be easily maintained in memory and updated in real time.

A key problem is, of course, what itemsets shall be selected for this purpose? To reduce memory usage, one may be tempted to select, for example, nothing but frequent (or even closed frequent) itemsets. However, if the frequency counts of a non-frequent itemset is not monitored, one will never know when it becomes frequent. A naive approach is to monitor all itemsets whose support is above a reduced threshold minsup−$\epsilon$, so that one will not miss itemsets whose current support is within $\epsilon$ of minsup when they become frequent. This approach is apparently not general enough.

In view of the foregoing, a need has been recognized in connection with improving upon the inadequacies and shortcomings of prior efforts.

SUMMARY OF THE INVENTION

In accordance with at least one presently preferred embodiment of the present invention, there is broadly contemplated a synopsis data structure designed to keep track of the boundary between closed frequent itemsets and the rest of the itemsets. Conceptual drifts in a data stream are reflected by boundary movements in the data structure. In other words, a status change of any itemset (e.g., from non-frequent to frequent) must occur through the boundary. The problem of mining an infinite amount of data is thus converted to mine data that can potentially change the boundary in the current model (i.e., the model being used before revision based on the new data distribution has been applied). This is facilitated because most of the itemsets do not often change status (essentially meaning that the boundary is stable); even if some itemsets do change status, the boundary movement is local at best. Thus, the cost of mining closed frequent itemsets is dramatically reduced (particularly, because previous results are still valid).

In accordance with at least one embodiment of the present invention, there is introduced a novel algorithm, Moment (Maintaining Closed Frequent Itemsets by Incremental Updates), to mine closed frequent itemsets over data stream sliding windows. Conventional arrangements do not appear capable of mining closed frequent itemsets in data streams. Also introduced herein is an in-memory data structure, the closed enumeration tree (CET), which monitors closed frequent itemsets as well as itemsets that form the boundary between the closed frequent itemsets and the rest of the itemsets. It is shown herebelow that i) a status change of any itemset (e.g., from non-frequent to frequent) must come through the boundary itemsets, which means one does not have to monitor itemsets beyond the boundary, and ii) the boundary is relatively stable, which means the update cost is minimum. Also introduced herein is a novel algorithm to maintain the CET in an efficient way.

Experimentation has revealed that Moment has significant performance advantage over conventional approaches for mining frequent itemsets in data streams.

In summary, one aspect of the invention provides a method of finding itemsets, said method comprising the steps of: providing a data stream sliding window; and finding exact closed frequent itemsets over the data stream sliding window.

Another aspect of the invention provides an apparatus for finding itemsets, said apparatus comprising: an arrangement for providing a data stream sliding window; and an arrangement for finding exact closed frequent itemsets over the data stream sliding window.

Furthermore, an additional aspect of the invention provides a program storage device readable by machine, tangibly embodying a program of instructions executable by the machine to perform method steps for finding itemsets, said method comprising the steps of: providing a data stream sliding window; and finding exact closed frequent itemsets over the data stream sliding window. For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 is a schematic representation of exemplary itemsets.

FIG. 3 conveys pseudo-code for an Explore algorithm.

FIG. 5 provides a high-level description of an addition operation.

FIG. 8 provides a high-level description of the deletion operation.

DESCRIPTION OF THE PREFERRED EMBODIMENTS

Figure 2:
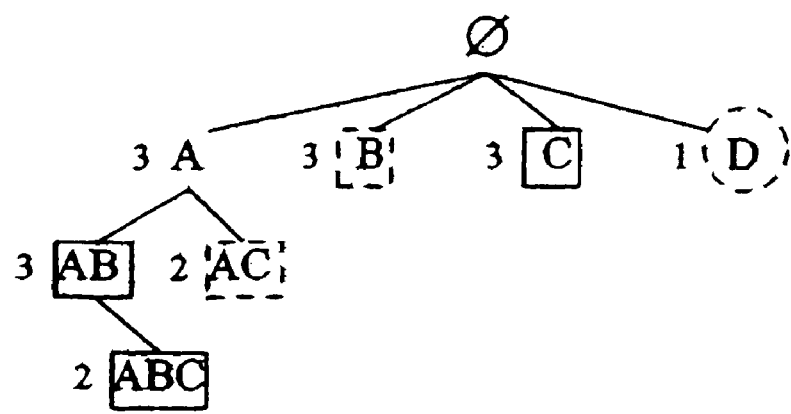
FIG. 2 is a schematic representation of a closed enumeration tree corresponding to itemsets shown in FIG. 1.

Given a set of items $\Sigma$, a database D wherein each transaction is a subset of $\Sigma$, and a threshold s called the minimum support (minsup), $0 < s \leq 1$, the frequent itemset mining problem is to find all itemsets that occur in at least $s|D|$ transactions.

It is assumed that there is a lexicographical order among the items in $\Sigma$ and there is used $X < Y$ to denote that item X is lexicographically smaller than item Y. Furthermore, an itemset can be represented by a sequence, wherein items are lexicographically ordered. For instance, $\{A, B, C\}$ is represented by ABC, given $A < B < C$. One also abuses notation by using $<$ to denote the lexicographical order between two itemsets. For instance, AB<ABC<CD.

As an example, let $\Sigma = \{A, B, C, D\}$, $D = \{CD, AB, ABC, ABC\}$, and $s = \frac{1}{2}$, then the frequent itemsets are $$F = \{(A,3), (B,3), (C,3), (AB,3), (AC,2), (BC,2), (ABC,2)\}$$

In F, each frequent itemset is associated with its support in database D.

According to the a priori property, any subset of a frequent itemset is also frequent. Thus, algorithms that mine all frequent itemsets often suffer from the problem of combinatorial explosion.

Two solutions have been proposed to alleviate this problem. In the first solution, (e.g., [1], [2]) only maximal frequent itemsets are discovered. A frequent itemset is maximal if none of its proper supersets is frequent. The total number of maximal frequent itemsets M is much smaller than that of frequent itemsets F, and one can derive each frequent itemset from M. However, M does not contain information of the support of each frequent itemset unless it is a maximal frequent itemset. Thus, mining only maximal frequent itemsets loses information.

In the second solution (e.g., [3], [4]) only closed frequent itemsets are discovered. An itemset is closed if none of its proper supersets has the same support as it has. The total number of closed frequent itemsets C is still much smaller than that of frequent itemsets F. Furthermore, one can derive F from C, because a frequent itemset I must be a subset of one (or more) closed frequent itemset, and I's support is equal to the maximal support of those closed itemsets that contain I.

In summary, the relation among F, C, and M is $M \subseteq C \subseteq F$. The closed and maximal frequent itemsets for the above examples are $$C = \{(C,3), (AB,3), (ABC,2)\}$$

$$M = \{(ABC,2)\}$$

Since C is smaller than F, and C does not lose information about any frequent itemsets, in accordance with at least one embodiment of the present invention, a focus is on mining the closed frequent itemsets because they maintain sufficient information to determine all the frequent itemsets as well as their support.

A problem addressed herein, in accordance with at least one presently preferred embodiment of the present invention, is to mine (closed) frequent itemsets in the most recent N transactions in a data stream. Each transaction has a time stamp, which is used as the tid (transaction id) of the transaction. FIG. 1 is an example with $\Sigma = \{A, B, C, D\}$ and window size N=4. This example is used throughout the disclosure with minimum support $s = \frac{1}{2}$ To find frequent itemsets on a data stream, one may preferably maintain a data structure that models the current frequent itemsets. One may preferably update the data structure incrementally. The combinatorial explosion problem of mining frequent itemsets becomes even more serious in the streaming environment. As a result, on the one hand, one cannot afford to keep track of all itemsets or even frequent itemsets, because of time and space constraints. On the other hand, any omission (for instance, maintaining only M, C, or F instead of all itemsets) may prevent us from discovering future frequent itemsets. Thus, the challenge lies in designing a compact data structure which does not lose information of any frequent itemset over a sliding window.

Proposed herein is the Moment algorithm and an in-memory data structure, the closed enumeration tree, to monitor a dynamically selected small set of itemsets that enable us to answer the query "what are the current closed frequent itemsets?" at any time.

Similar to a prefix tree, each node $n_I$ in a closed enumeration tree (CET) represents an itemset I. A child node, $n_J$, is obtained by adding a new item to I such that I<J. However, unlike a prefix tree, which maintains all itemsets, a CET only maintains a dynamically selected set of itemsets, which include i) closed frequent itemsets, and ii) itemsets that form a boundary between closed frequent itemsets and the rest of the itemsets.

As long as the window size is reasonably large, and the conceptual drifts in the stream is not too dramatic, most itemsets do not change their status (from frequent to non-frequent or from non-frequent to frequent). In other words, the effects of transactions moving in and out of a window offset each other and usually do not cause change of status of many involved nodes.

If an itemset does not change its status, nothing needs to be done except for increasing or decreasing the counts of the involved itemsets. If it does change its status, then, as will be shown, the change must come through the boundary nodes, which means the changes to the entire tree structure is still limited.

One preferably further divides itemsets on the boundary into two categories, which correspond to the boundary between frequent and non-frequent itemsets, and the boundary between closed and non-closed itemsets, respectively.

Itemsets within the boundary also have two categories, namely the closed nodes, and other intermediary nodes that have closed nodes as descendants. For each category, there are preferably defined specific actions to be taken in order to maintain a shifting boundary when there are concept drifts in data streams (see herebelow). The four types of itemsets are listed below.

1. Infrequent gateway nodes. A node $n_I$ is an infrequent gateway node if i) I is an infrequent itemset, and ii) $n_I$'s parent or the siblings of $n_I$'s parent (if there are any) are frequent. In FIG. 2, D is an infrequent gateway node (represented by dashed circle). In contrast, AD is not an infrequent gateway node (hence it does not appear in the CET), because D is infrequent.

2. Unpromising gateway nodes. A node $n_I$ is an unpromising gateway node if i) I is a frequent itemset, and ii) there exists a closed frequent itemset J such that J<I, J ⊃ I, and J has the same support as I does. In FIG. 2, B is an unpromising gateway node because AB has the same support as it does. So is AC because of ABC. In FIG. 2, unpromising gateway nodes are represented by dashed rectangles. For convenience of discussion, when a node in the CET is neither an infrequent gateway node nor an unpromising gateway node, one may call it a promising node.

3. Intermediate nodes. A node n, is an intermediate node if i) I is a frequent itemset, ii) $n_I$ has a child node $n_J$ such that J has the same support as I does, and iii) $n_I$ is not an unpromising gateway node. In FIG. 2, A is an intermediate node because its child AB has the same support as A does.

4. Closed nodes. These nodes represent closed frequent itemsets in the current sliding-window. A closed node can be an internal node or a leaf node. In FIG. 2, C, AB, and ABC are closed nodes, which are represented by solid rectangles.

Herebelow there are proven some properties for the nodes in the CET. Properties 1 and 2 enable us to prune a large amount of itemsets from the CET, while Property 3 makes sure certain itemsets are not pruned. Together, they enable us to mine closed frequent itemsets over a sliding window using an efficient and compact synopsis data structure.

Property 1. If $n_I$ is an infrequent gateway node, then any node $n_J$ where J ⊃ I represents an infrequent itemset.

Proof. Property 1 is derived from the a priori property.

A CET achieves its compactness by pruning a large amount of the itemsets. It prunes the descendants of $n_I$ and the descendants of $n_I$'s siblings nodes that subsume I. However, it "remembers" the boundary where such pruning occurs, so that it knows where to start exploring when $n_I$ is no longer an infrequent gateway node. An infrequent gateway node marks such a boundary. In particular, infrequent gateway nodes are leaf nodes in a CET. For example, in FIG. 2, after knowing that D is infrequent, one preferably does not explore the subtree under D. Furthermore, one preferably does not join A with D to generate A's child nodes. As a result, a large amount of the itemsets are pruned.

Property 2. If $n_I$ is an unpromising gateway node, then $n_I$ is not closed, and none of $n_I$'s descendents is closed.

Proof. Based on the definition of unpromising gateway nodes, there exists an itemset J such that i) J<I, and ii) J ⊃ I and support(J)=support(I).

From ii), it is known that $n_I$ is not closed. Let $i_{max}$ be the lexicographically largest item in I. Since J<I and J ⊃ I, there must exist an item j∈J\I such that j<$i_{max}$. Thus, for any descendant $n_{I'}$ of $n_I$, one has j∉I'. Furthermore, because support(J)=support(I), itemset J\I must appear in every transaction I appears, which means support ($n_{I'}$)=support ($n_{\{j\} \cup I'}$), so I' is not closed.

Descendants of an unpromising gateway node are pruned because no closed nodes can be found there, and it "remembers" the boundary where such pruning occurs.

Property 3. If $n_I$ is an intermediate node, then $n_I$ is not closed and $n_I$ has closed descendants.

Proof. Based on the definition of intermediate nodes, $n_I$ is not closed. Thus, there must exists a closed node $n_J$ such that J ⊃ I and support(J)=support(I). If I<J, then $n_J$ is $n_I$'s descendant since J ⊃ I. If J<I then $n_I$ is an unpromising gateway node, which means $n_I$ is not an intermediate node.

Property 3 shows that one cannot prune intermediate nodes.

By way of building a closed enumeration tree, in a CET, one preferably stores the following information for each node $n_I$: i) the itemset I itself, ii) the node type of $n_I$, iii) support: the number of transactions in which I occurs, and iv) tid_sum: the sum of the tids of the transactions in which I occurs. The purpose of having tid_sum is because there is used a hash table to maintain closed itemsets.

Preferably, one frequently checks whether or not a certain node is an unpromising gateway node, which means one essentially needs to know whether there is a closed frequent node that has the same support as the current node.

One preferably uses a hash table to store all the closed frequent itemsets. To check if $n_I$ is an unpromising gateway node, by definition, one checks if there is a closed frequent itemset J such that J<I, J ⊃ I, and support(J)=support(I).

One can thus use support as the key to the hash table. However, it may create frequent hash collisions. It is known that if support(I)=support(J) and I ⊂ J, then I and J must occur in the same set of transactions. Thus, a better choice is the set of tids. However, the set of tids take too much space, so one instead preferably uses (support, tid_sum) as the key. Note that tid_sum of an itemset can be incrementally updated. To check if $n_I$ is an unpromising gateway node, one preferably hashes on the (support, tid_sum) of $n_I$, fetch the list of closed frequent itemsets in the corresponding entry of the hash table, and check if there is a J in the list such that J<I, J ⊃ I, and support(J)=support(I).

To build a CET, first there is preferably created a root node $n_\varnothing$. Second, there are preferably created |Σ| child nodes for $n_\varnothing$ (i.e., each i∈Σ corresponds to a child node $n_{\{i\}}$), and then Explore is called on each child node $n_{\{i\}}$. Pseudo code for the Explore algorithm is given in FIG. 3.

Explore is a depth-first procedure that visits itemsets in lexicographical order. In lines 1-2 of FIG. 3, if a node is found to be infrequent, then it is marked as an infrequent gateway node, and one does not explore it further (Property 1). However, the support and tid_sum of an infrequent gateway node have to be stored because they will provide important information during a CET update when an infrequent itemset can potentially become frequent.

In lines 3-4, when an itemset I is found to be non-closed because of another lexicographically smaller itemset, then $n_I$ is an unpromising gateway node. Based on Property 2, one does not explore $n_I$'s descendants, which does not contain any closed frequent itemsets. However, $n_I$'s support and tid_sum must be stored, because during a CET update, $n_I$ may become promising.

In Explore, leftcheck($n_I$) checks if $n_I$ is an unpromising gateway node. It looks up the hash table to see if there exists a previously discovered closed itemset that has the same support as $n_I$ and which also subsumes I, and if so, it returns true (in this case $n_I$ is an unpromising gateway node); otherwise, it returns false (in this case $n_I$ is a promising node).

If a node $n_I$ is found to be neither infrequent nor unpromising, then one explores its descendants (lines 6-10). After that, one can determine if $n_I$ is an intermediate node or a closed node (lines 11-15) according to Property 3.

The time complexity of the Explore algorithm depends on the size of the sliding-window N, the minimum support, and the number of nodes in the CET. However, because Explore only visits those nodes that are necessary for discovering closed frequent itemsets, so Explore should have the same asymptotic time complexity as any closed frequent itemset mining algorithm that are based on traversing the enumeration tree.

By way of updating the CET, new transactions are preferably inserted into the window, as old transactions are deleted from the window. Discussed herebelow is the maintenance of the CET for the two operations: addition and deletion.

Figure 4:
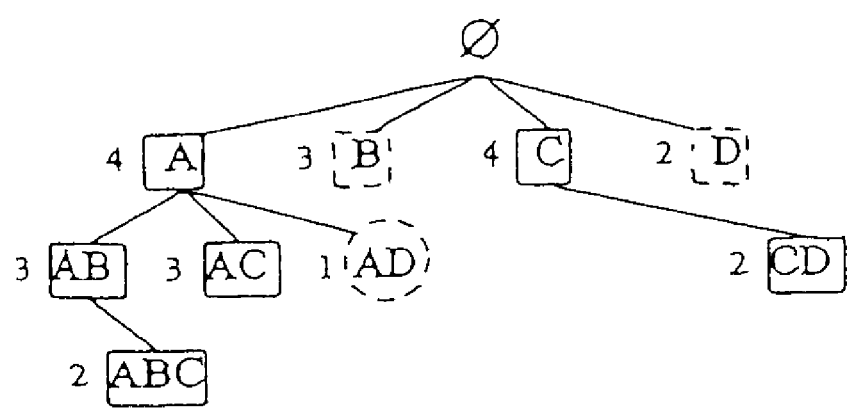
FIG. 4 conveys a new transaction being added to a sliding-window.

In FIG. 4, a new transaction T (tid 5) is added to the sliding-window. There are traversed the parts of the CET that are related to transaction T. For each related node $n_I$, there is updated its support, tid_sum, and possibly its node type.

Most likely, $n_I$'s node type will not change, in which case, one simply updates $n_I$'s support and tid_sum, and the cost is minimum. Herebelow, there are discussed cases where the new transaction T causes $n_I$ to change its node type.

1. $n_I$ was an infrequent gateway node. If $n_I$ becomes frequent (e.g., from node D in FIG. 2 to node D in FIG. 4), two types of updates must be made. First, for each of $n_I$'s left siblings it must be checked if new children should be created. Second, the originally pruned branch (under $n_I$) must be re-explored by calling Explore.

For example, in FIG. 4, after D changes from an infrequent gateway node to a frequent node, node A and C must be updated by adding new children (AD and CD, respectively). Some of these new children will become new infrequent gateway nodes (e.g., node AD), and others may become other types of nodes (e.g., node CD becomes a closed node). In addition, this update may propagate down more than one level.

2. $n_I$ was an unpromising gateway node. Node $n_I$ may become promising (e.g., from node AC in FIG. 2 to node AC in FIG. 4) for the following reason. Originally, $\exists (j<i_{max}$ and $j \notin I)$ s.t. j occurs in each transaction that I occurs. However, if T contains I but not any of such j's, then the above condition does not hold anymore. If this happens, the originally pruned branch (under $n_I$) must be explored by calling Explore.

3. $n_I$ was a closed node. Based on the following property, $n_I$ will remain a closed node.

Property 4. Adding a new transaction will not change a node from closed to non-closed, and it will not decrease the number of closed itemsets in the sliding-window.

Proof. Originally, $\forall J \supset I$, support(J)<support(I); after adding the new transaction T, $\forall J \supset I$, if $J \subset T$ then $I \subset T$. Therefore if J's support is increased by one because of T, so is I's support. As a result, $\forall J \supset I$, support(J)<support(I) still holds after adding the new transaction T. However, if a closed node $n_I$ is visited during an addition, its entry in the hash table will be updated. Its support is increased by 1 and its tid_sum is increased by adding the tid of the new transaction.

4. $n_I$ was an intermediate node. An intermediate node, such as node A in FIG. 2, can possibly become a closed node after adding a new transaction T. Originally, $n_I$ was an intermediate node because one of $n_I$'s children has the same support as $n_I$ does; if T contains I but none of $n_I$'s children who have the same support as $n_I$ had before the addition, then $n_I$ becomes a closed node because its new support is higher than the support of any of its children. However, $n_I$ cannot change to an infrequent gateway node or an unpromising gateway node. First, $n_I$'s support will not decrease because of adding T, so it cannot become infrequent. Second, if before adding T, leftcheck($n_I$) =false, then $\nexists (j<i_{max}$ and $j \notin I)$ s.t. j occurs in each transaction that I occurs; this statement will not change after T is added. Therefore, leftcheck($n_I$)=false after the addition.

FIG. 5 gives a high-level description of the addition operation. Adding a new transaction to the sliding-window will trigger a call of Addition on $n_o$, the root of the CET.

Figure 6:
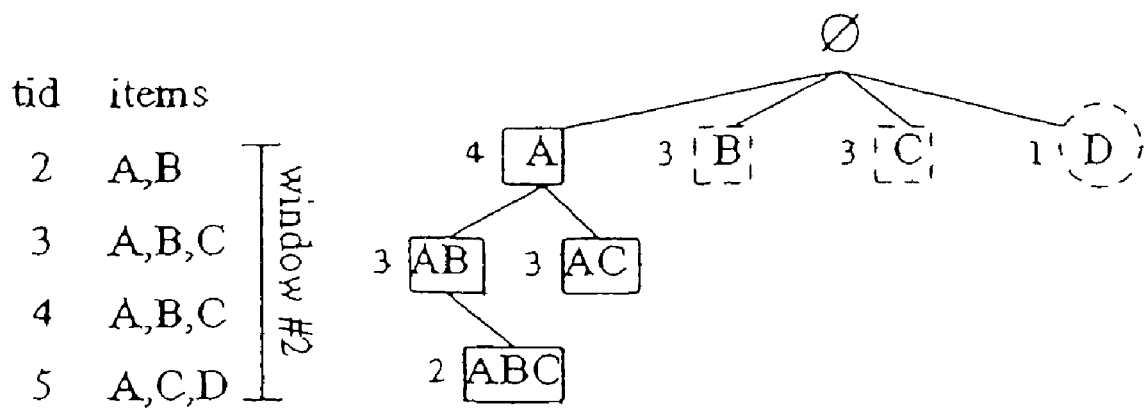
FIG. 6 conveys an old transaction being deleted from a sliding-window.

In FIG. 6, an old transaction T (tid 1) is deleted from the sliding-window. To delete a transaction, one also traverses the parts of the CET that are related to the deleted transaction. Most likely, $n_I$'s node type will not change, in which case, one simply updates $n_I$'s support and tid_sum, and the cost is minimum. In the following, there is discussed the impact of deletion in detail.

If $n_I$ was an infrequent gateway node, clearly deletion does not change $n_I$'s node type. If $n_I$ was an unpromising gateway node, deletion may change $n_I$ to infrequent but will not change $n_I$ to promising, for the following reason. For an unpromising gateway node $n_I$, if before deletion, leftcheck($n_I$)=true, then $\exists (j<i_{max}$ and $j \notin I)$ s.t. j occurs in each transaction that I occurs; this statement remains true when one deletes a transaction.

If $n_I$ was a frequent node, it may become infrequent because of a decrement of its support, in which case, all $n_I$'s descendants are pruned and $n_I$ becomes an infrequent gateway node In addition, all of $n_I$'s left siblings are updated by removing children obtained from joining with $n_I$. For example in FIG. 6, when transaction T (tid 1) is removed from the window, node D becomes infrequent. One preferably prunes all descendants of node D, as well as AD and CD, which were obtained by joining A and C with D, respectively.

If $n_I$ was a promising node, it may become unpromising because of the deletion, as happens to node C in FIG. 6. Therefore, if originally $n_I$ was neither infrequent nor unpromising, then one has to do the leftcheck on $n_I$. For a node $n_I$ to change to unpromising because of a deletion, $n_I$ must be contained in the deleted transaction. Therefore $n_I$ will be visited by the traversal and it will not be missed.

Figure 7:
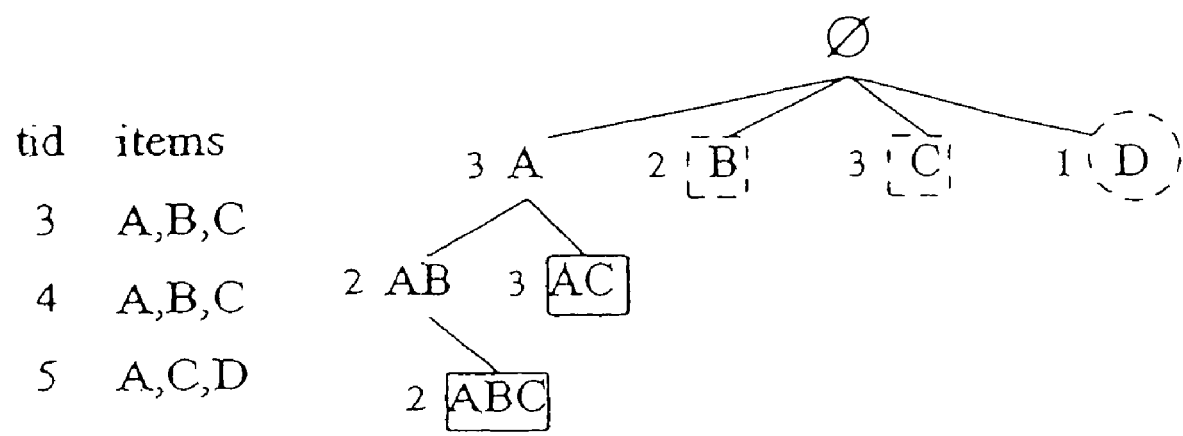
FIG. 7 conveys another transaction being deleted from a sliding-window.

If $n_I$ was a closed node, it may become non-closed. To demonstrate this, one preferably deletes another transaction T (tid 2) from the sliding-window. FIG. 7 shows this example where previously closed node $n_I$ (e.g. A and AB) become non-closed because of the deletion. This can be determined by looking at the supports of the children of $n_I$ after visiting them. If a previously closed node that is included in the deleted transaction remains closed after the deletion, one still needs to update its entry in the hash table: its support is decreased by 1 and its tid_sum is decreased by subtracting the tid of the deleted transaction.

From the above discussion there is derived the following property for the deletion operation on a CET.

Property 5. Deleting an old transaction will not change a node in the CET from non-closed to closed, and therefore it will not increase the number of closed item-sets in the sliding-window.

Proof. If an itemset I was originally non-closed, then before the deletion, $\exists j \notin I$ s.t. j occurs in each transaction that I occurs. Clearly, this fact will not be changed due to deleting a transaction. So I will still be non-closed after the deletion.

FIG. 8 gives a high-level description of the deletion operation. Some details are skipped in the description. For example, when pruning a branch from the CET, all the closed frequent itemsets in the branch should be removed from the hash table.

For addition, Explore is a rather time-consuming operation, because it scans the transactions in the sliding-window. However, as demonstrated in experimentation, the number of such invocations is very small, as most insertions will not change node types. In addition, the new branches grown by calling Explore are usually very small subsets of the whole CET, therefore such incremental growing takes much less time than regenerating the whole CET. On the other hand, deletion only involves related nodes in the CET, and does not scan transactions in the sliding-window. Therefore, its time complexity is at most linear to the number of nodes. Usually it is faster to perform a deletion than an addition.

It is easy to show that if a node $n_I$ changes node type (frequent/infrequent and promising/unpromising), then I is in the added or deleted transaction and therefore $n_I$ is guaranteed to be visited during the update. Consequently, the algorithm will correctly maintain the current close frequent itemsets after any of the two operations. Furthermore, if $n_I$ remains closed after an addition or a deletion and I is contained in the added/deleted transaction, then its position in the hash table is changed because its support and tid_sum are changed. To make the update, one preferably deletes the itemset from the hash table and re-insert it back to the hash table based on the new key value. However, such an update has constant time complexity.

In our discussion so far, there have been used sliding-windows of fixed size. However, the two operations—addition and deletion—are independent of each other. Therefore, if needed, the size for the sliding-window can grow or shrink without affecting the correctness of our algorithm. In addition, our algorithm does not restrict a deletion to happen at the end of the window: at a given time, any transaction in the sliding-window can be removed. For example, if when removing a transaction, the transaction to be removed is picked following a random scheme: e.g., the newer transactions have lower probability of being removed than the older ones, then our algorithm can implement a sliding-window with soft boundary, i.e., the more recent the transaction, the higher chance it will remain in the sliding-window.

In addition, so far our algorithm only handles one transaction in one update. In reality, there are situations in which data are bursty and multiple transactions need to be added and deleted during one update. However, it is not difficult to adapt our algorithm to handle multiple transactions in one update. Originally, for an addition or a deletion, one traverses the CET with the single added or deleted transaction; if an update contains a batch of transactions, one can still traverse the CET in the same fashion using the batch of transactions and project out unrelated transactions along the traversal.

By way of recapitulation, there is proposed herein a novel algorithm, Moment, to discover and maintain all closed frequent itemsets in a sliding window that contains the most recent samples in a data stream. In the Moment algorithm, an efficient in-memory data structure, the closed enumeration tree (CET), is used to record all closed frequent itemsets in the current sliding window. In addition, CET also monitors the itemsets that form the boundary between closed frequent itemsets and the rest of the itemsets. There have also been developed efficient algorithms to incrementally update the CET when newly-arrived transactions change the content of the sliding window. Experimental studies show that the Moment algorithm outperforms a state-of-the-art algorithm that mines closed frequent itemsets without using incremental updates. In addition, the memory usage of the Moment algorithm is shown to be linear in the number of closed frequent itemsets in the sliding window.

It is to be understood that the present invention, in accordance with at least one presently preferred embodiment, includes an arrangement for providing a data stream sliding window and an arrangement for finding exact closed frequent itemsets over the data stream sliding window. Together, these elements may be implemented on at least one general-purpose computer running suitable software programs. They may also be implemented on at least one integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirely herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

[1] R. J. Bayardo, Jr. Efficiently mining long patterns from databases. In *Proceedings of the ACM SIGMOD*, 1998.
[2] K. Gouda and M. J. Zaki. Efficiently mining maximal frequent itemsets. In *Proceedings of the 2001 IEEE Int'l Conf. on Data Mining*, 2001.
[3] J. Wang, J. Han, and J. Pei. Closet+: searching for the best strategies for mining frequent closed itemsets. In *Proc. of the 2003 Int. Conf. Knowledge Discovery and Data Mining (SIGKDD'03)*, 2003.
[4] M. J. Zaki. Fast vertical mining using diffsets. In *Proc. of the 2003 Int. Conf. Knowledge Discovery and Data Mining (SIGKDD'03)*, 2003.

What is claimed is:

1. A computer-implemented method of finding itemsets, said method when executed by a computer comprising the steps of:
   providing a data stream sliding window; and
   finding exact closed frequent itemsets over the data stream sliding window;
   incrementally maintaining a dynamic boundary between closed frequent itemsets and itemsets that are not frequent or that cannot be closed; and
   providing a closed enumeration tree for storing closed frequent itemsets and other itemsets that define the dynamic boundary;
   wherein said step of providing a closed enumeration tree comprises:
      defining at least the following types of nodes in defining the dynamic boundary: infrequent gateway nodes, unpromising gateway nodes, intermediate nodes, and closed nodes;
      dividing itemsets on the dynamic boundary into at least two categories, wherein one category comprises itemsets on a boundary between frequent and non-frequent itemsets and another comprises itemsets on a boundary between closed and non-closed itemsets;
      dividing itemsets within the dynamic boundary into at least two categories, wherein one category comprises closed nodes and another comprises intermediary nodes with closed nodes as descendants; and
      defining specific actions for said categories of itemsets on the dynamic boundary and for said categories of itemsets within the dynamic boundary to maintain the dynamic boundary.

2. The method according to claim 1, further comprising the step of generating two streams, wherein one stream comprises itemsets that have newly become closed frequent and another stream comprises itemsets that have newly ceased to be closed frequent.

3. The method according to claim 1, further comprising the step of dynamically changing the sliding window size.

4. The method according to claim 1, further comprising the steps of:
   establishing a lowest possible threshold; and
   changing, during said step of finding exact closed frequent itemsets, the threshold to one larger than the lowest possible threshold.

5. The method according to claim 1, further comprising the step of providing a hash table that contains all closed frequent itemsets and a prefix tree for storing all transactions in the sliding window.

6. The method according to claim 5, further comprising at least one of the following steps:
   implementing a random algorithm to ensure that older transactions are more likely to be removed from the sliding window;
   simultaneously adding and deleting multiple transactions in the sliding window; and
   delaying a transaction deletion to avert a future operation of adding a transaction.

7. An apparatus for finding itemsets, said apparatus comprising:
   a processor;
   an arrangement for providing a data stream sliding window;
   an arrangement for finding exact closed frequent itemsets over the data stream sliding window;
   an arrangement for incrementally maintaining a dynamic boundary between closed frequent itemsets and itemsets that are not frequent or that cannot be closed;
   an arrangement for providing a closed enumeration tree for storing closed frequent itemsets and other itemsets that define the dynamic boundary; and
   wherein said arrangement for providing a closed enumeration tree is adapted to:
      define at least the following types of nodes in defining the dynamic boundary: infrequent gateway nodes, unpromising gateway nodes, intermediate nodes, and closed nodes;
      divide itemsets on the dynamic boundary into at least two categories, wherein one category comprises itemsets on a boundary between frequent and non-frequent itemsets and another comprises itemsets on a boundary between closed and non-closed itemsets;
      divide itemsets within the dynamic boundary into at least two categories, wherein one category comprises closed nodes and another comprises intermediary nodes with closed nodes as descendants; and
      define specific actions for said categories of itemsets on the dynamic boundary and for said categories of itemsets within the dynamic boundary to maintain the dynamic boundary.

8. The apparatus according to claim 7, further comprising an arrangement for generating two streams, wherein one stream comprises itemsets that have newly become closed frequent and another stream comprises itemsets that have newly ceased to be closed frequent.

9. The apparatus according to claim 7, further comprising an arrangement for dynamically changing the sliding window size.

10. The apparatus according to claim 1, further comprising:
    an arrangement for establishing a lowest possible threshold; and
    an arrangement for changing, during the finding of exact closed frequent itemsets, the threshold to one larger than the lowest possible threshold.

11. The apparatus according to claim 7, further comprising an arrangement for providing a hash table that contains all closed frequent itemsets and a prefix tree for storing all transactions in the sliding window.

12. The apparatus according to claim 11, further comprising at least one of:
    an arrangement for implementing a random algorithm to ensure that older transactions are more likely to be removed from the sliding window;
    an arrangement for simultaneously adding and deleting multiple transactions in the sliding window; and
    an arrangement for delaying a transaction deletion to avert a future operation of adding a transaction.

* * * * *